US009909089B2

(12) United States Patent
Mitchell et al.

(10) Patent No.: US 9,909,089 B2
(45) Date of Patent: Mar. 6, 2018

(54) WINE PUMP-OVER DEVICE

(71) Applicants: Alexander Mitchell, Saint Helena, CA (US); Evan Schneider, Piedmont, CA (US)

(72) Inventors: Alexander Mitchell, Saint Helena, CA (US); Evan Schneider, Piedmont, CA (US)

( * ) Notice: Subject to any disclaimer, the term of this patent is extended or adjusted under 35 U.S.C. 154(b) by 328 days.

(21) Appl. No.: 14/868,468

(22) Filed: Sep. 29, 2015

(65) Prior Publication Data

US 2016/0068791 A1    Mar. 10, 2016

Related U.S. Application Data

(63) Continuation-in-part of application No. 14/478,269, filed on Sep. 5, 2014, now Pat. No. 9,550,968.

(51) Int. Cl.
*C12G 1/02*     (2006.01)
*B05B 3/04*     (2006.01)
*C12G 1/032*    (2006.01)

(52) U.S. Cl.
CPC .............. *C12G 1/02* (2013.01); *B05B 3/0418* (2013.01); *B05B 3/0463* (2013.01); *B05B 3/0486* (2013.01); *C12G 1/0216* (2013.01); *Y10T 137/85954* (2015.04)

(58) Field of Classification Search
CPC . C12G 1/02; C12G 1/0216; Y10T 137/85954; B05B 3/0418; B05B 3/0463; B05B 3/0486
See application file for complete search history.

(56) References Cited

U.S. PATENT DOCUMENTS

| | | | | |
|---|---|---|---|---|
| 2,489,952 | A | * 11/1949 | Boudreaux | B05B 1/265 169/37 |
| 3,478,669 | A | * 11/1969 | Lanes | C12G 1/0216 99/276 |
| 3,532,273 | A | * 10/1970 | Buckingham | A01J 7/025 239/222.17 |
| 3,871,272 | A | * 3/1975 | Melandri | C12G 1/0216 366/137 |

(Continued)

FOREIGN PATENT DOCUMENTS

| | | | |
|---|---|---|---|
| EP | 1026233 | * | 8/2000 |
| JP | 8-308552 | * | 11/1996 |
| JP | 2003001224 | * | 1/2003 |

*Primary Examiner* — Anthony Weier
(74) *Attorney, Agent, or Firm* — AKC Patents, LLC; Aliki K. Collins

(57) ABSTRACT

A device for distributing a fermented liquid uniformly over a fermented cap includes a joint member, an impeller, a shaft and a flow conditioner. The joint member has a top opening, a bottom opening, a side opening, a through-opening extending from the top opening to the bottom opening and a side-through-opening extending from the side opening to the through-opening. The impeller includes a one-piece conical shaped body that has a central-through-opening. The shaft extends through the through-opening of the joint member and through the central-through-opening of the impeller. The flow conditioner extends from the bottom of the joint member and surrounds the shaft. The bottom of the flow conditioner is shaped to match the shape of the fermentation tank.

21 Claims, 16 Drawing Sheets

(56) References Cited

U.S. PATENT DOCUMENTS

| | | | |
|---|---|---|---|
| 3,910,173 A * | 10/1975 | Zepponi | A23N 1/00 222/460 |
| 5,972,661 A * | 10/1999 | Kubera | B01F 3/04609 261/123 |
| 6,279,457 B1 * | 8/2001 | Francia | C12G 1/0216 99/277 |
| 6,631,732 B1 | 10/2003 | Kostel et al. | |
| 6,715,404 B2 | 4/2004 | Pratt | |
| 6,805,885 B2 | 10/2004 | Francia | |
| 6,945,158 B1 | 9/2005 | Virtue | |
| 7,353,750 B2 | 4/2008 | Francia | |
| 9,550,968 B2 * | 1/2017 | Mitchell | B05B 3/0463 |
| 2004/0166000 A1 | 8/2004 | Fisher et al. | |
| 2011/0318823 A1 | 12/2011 | Crosato | |
| 2013/0199376 A1 | 8/2013 | Rule | |

* cited by examiner

WINE PUMP-OVER DEVICE

CROSS REFERENCE TO RELATED CO-PENDING APPLICATIONS

This application is a continuation-in-part and claims the benefit of U.S. application Ser. No. 14/478,269 filed Sep. 5, 2014 now U.S. Pat. No. 9,550,968, and entitled "WINE PUMP-OVER DEVICE", the contents of which are expressly incorporated herein by reference.

FIELD OF THE INVENTION

The present invention relates to a wine pump-over device used in the process of making wine and in particular to a wine pump-over device used for distributing wine over the wine cap.

BACKGROUND OF THE INVENTION

Red wine is produced by first crushing red and black grapes and then fermenting the crushed grapes including their skins, seeds, grape juice and pulp (also called must). Usually, yeast is added to the must to start the fermentation process. Fermentation may also occur naturally. During fermentation, the yeast converts the sugars in the grape juice into ethanol and carbon dioxide. The rising carbon dioxide pushes the grape skins to the top and forms a "cap" or "head" of grape skins on the surface of the fermenting red wine. The cap includes naturally occurring substances that are useful in the fermentation process and the overall quality and taste of the wine. Therefore, the free-run wine is pumped and sprinkled over the cap in order to extract and mix the naturally occurring useful chemicals with the free-run wine in the bottom of the fermentation tank.

Several devices have been used to facilitate the pumping and sprinkling of the free-run wine over the cap. Uniform distribution of the free-run wine over the cap is critical to the quality and taste of the wine. Also critical are the unobstructed flow of the free-run wine through the wine-pump over and sprinkling device, the droplet size of the wine exiting the sprinkling device and the ease of cleaning of the device.

SUMMARY OF THE INVENTION

The present invention relates to a pump-over device used in the process of making wine or other fermented liquid and in particular to a pump-over device used in distributing wine or fermented liquid over the wine/fermented cap. The pump-over device of this invention provides uniform and homogeneous distribution of the free-run wine/fermented liquid over the cap, unobstructed flow of the free-run wine through the device and ease of cleaning of the device.

In general, in one aspect, the invention features a device for distributing fermented liquid uniformly over a fermented cap in a fermentation tank including a joint member, an impeller, a shaft and a flow conditioner. The joint member has a top opening, a bottom opening, a side opening, a through-opening extending from the top opening to the bottom opening and a side-through-opening extending from the side opening to the through-opening. The impeller includes a one-piece conical shaped body that has a central-through-opening. The shaft extends through the through-opening of the joint member and through the central-through-opening of the impeller. The flow conditioner extends from the bottom of the joint member and surrounds the shaft, and is configured to optimize together with the impeller the flow of the fermented liquid over the fermented cap. The bottom of the flow conditioner is shaped to match the shape of the fermentation tank. The joint member allows fermented liquid to be pumped into the through-opening through the side opening and to exit through the bottom opening and to flow onto the impeller and the impeller allows the fermented liquid to flow uniformly around and down the conical-shaped outer surface of the impeller and through the impeller.

Implementations of this aspect of the invention include one or more of the following. The flow conditioner has an elongated body having an axial through-opening. Ridges may be formed in an inner surface of the elongated body. The elongated body of the flow conditioner has a bottom with rectangular outer perimeter or a square outer perimeter. The bottom of the flow conditioner includes a cloverleaf shaped inner perimeter. The flow conditioner is integral with the joint member. The one-piece conical shaped body of the impeller has a circular base, a cylindrical center, a conical-shaped outer surface, the central-through-opening extending through the cylindrical center, and one or more curved blades extending from the top of the cylindrical center along the inclined outer surface. Each of the curved blades is configured to be twisted around the cylindrical center and has a slope and/or shape that are different from another curved blade's slope and/or shape. The impeller further includes one or more twisted through-slots that allow the fermented liquid to pass through the impeller and wet the fermented cap underneath the impeller. The top of the cylindrical center has a conical shape. The one-piece conical shaped body of the impeller is made of plastic, bronze, stainless steel, ceramic, metals, alloys or composites. The device further includes a cover configured to cover the top opening of the joint member. The top end of the shaft is attached to the center of the cover. The impeller is configured to rotate around the shaft. The device further includes a bearing configured to reduce rotational friction during the rotation of the impeller. The bearing is made of plastic, bronze, stainless steel, ceramic, metals, alloys or composites. The device further includes a bushing configured to be inserted into the central-through-opening and to prevent swaying of the impeller. The bushing is made of plastic, bronze, stainless steel, ceramic, metals, alloys or composites. The distance between the top of the impeller and the bottom of the joint member is configured to be adjustable. The device further includes a clamp ring configured to secure the position of the impeller relative to the shaft and thereby to adjust the distance between the top of the impeller and the bottom of the joint member.

The details of one or more embodiments of the invention are set forth in the accompanying drawings and description below. Other features, objects and advantages of the invention will be apparent from the following description of the preferred embodiments, the drawings and from the claims.

DETAILED DESCRIPTION OF THE INVENTION

The present invention provides a wine pump-over device used in the process of making wine. The wine pump-over device is used for distributing wine over the wine cap. The wine pump-over device of this invention provides uniform and homogeneous distribution of the free-run wine over the cap, unobstructed flow of the free-run wine through the device and ease of cleaning of the device.

Figure 1:
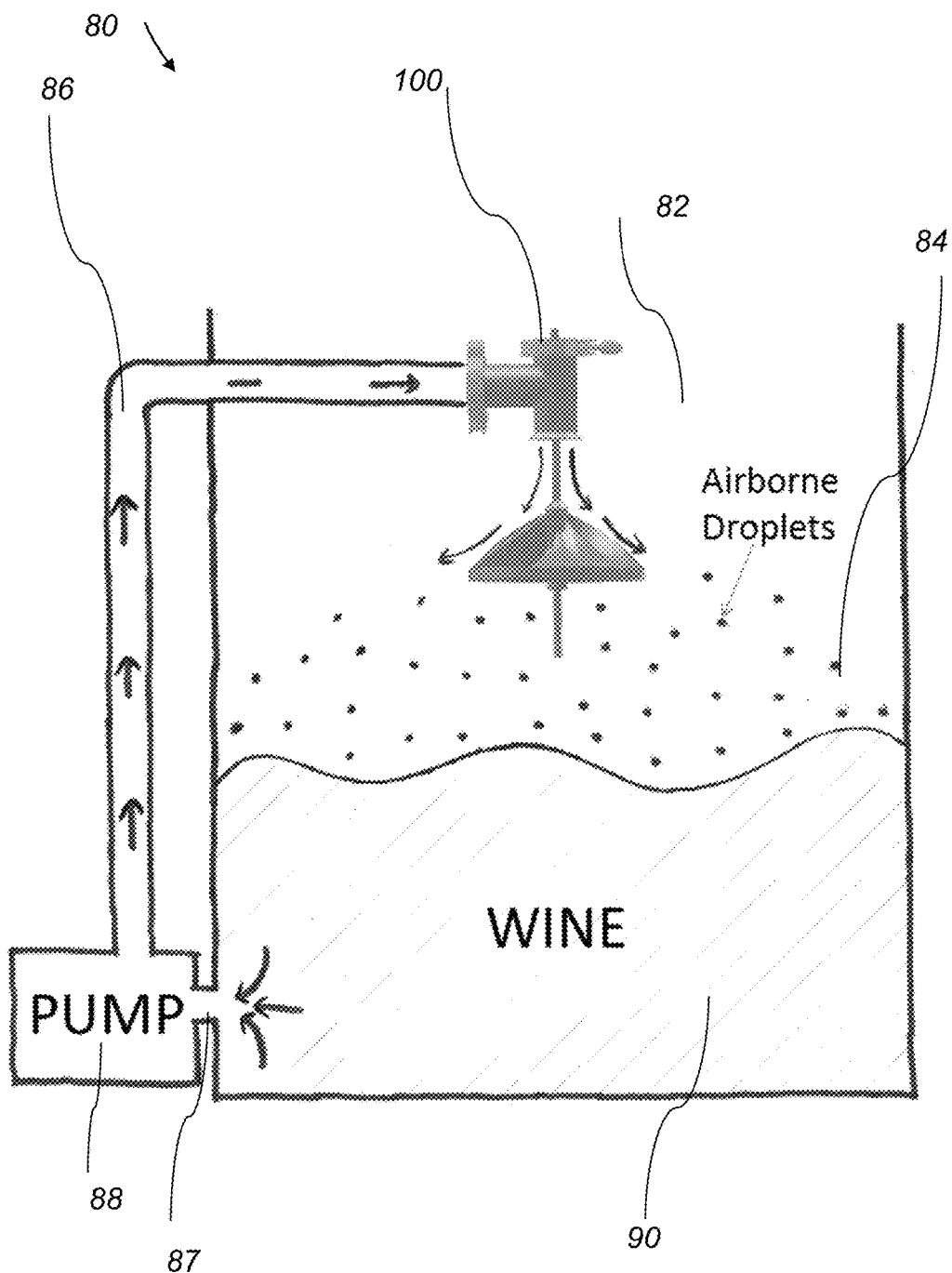
FIG. 1 depicts a fermentation tank with the wine pump-over device of this invention.
Figure 2:
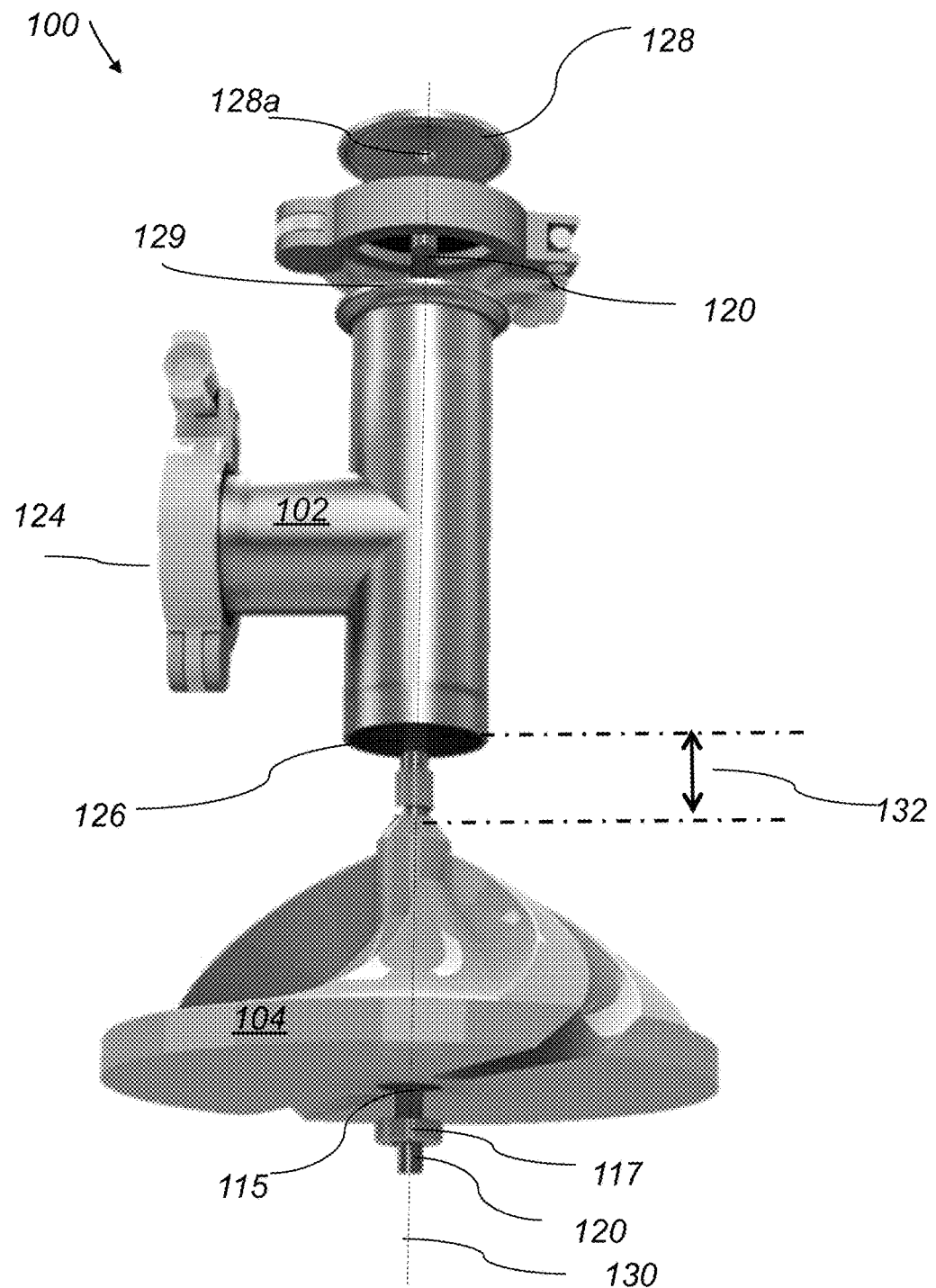
FIG. 2 is a perspective view of the wine pump-over device of FIG. 1.
Figure 3:
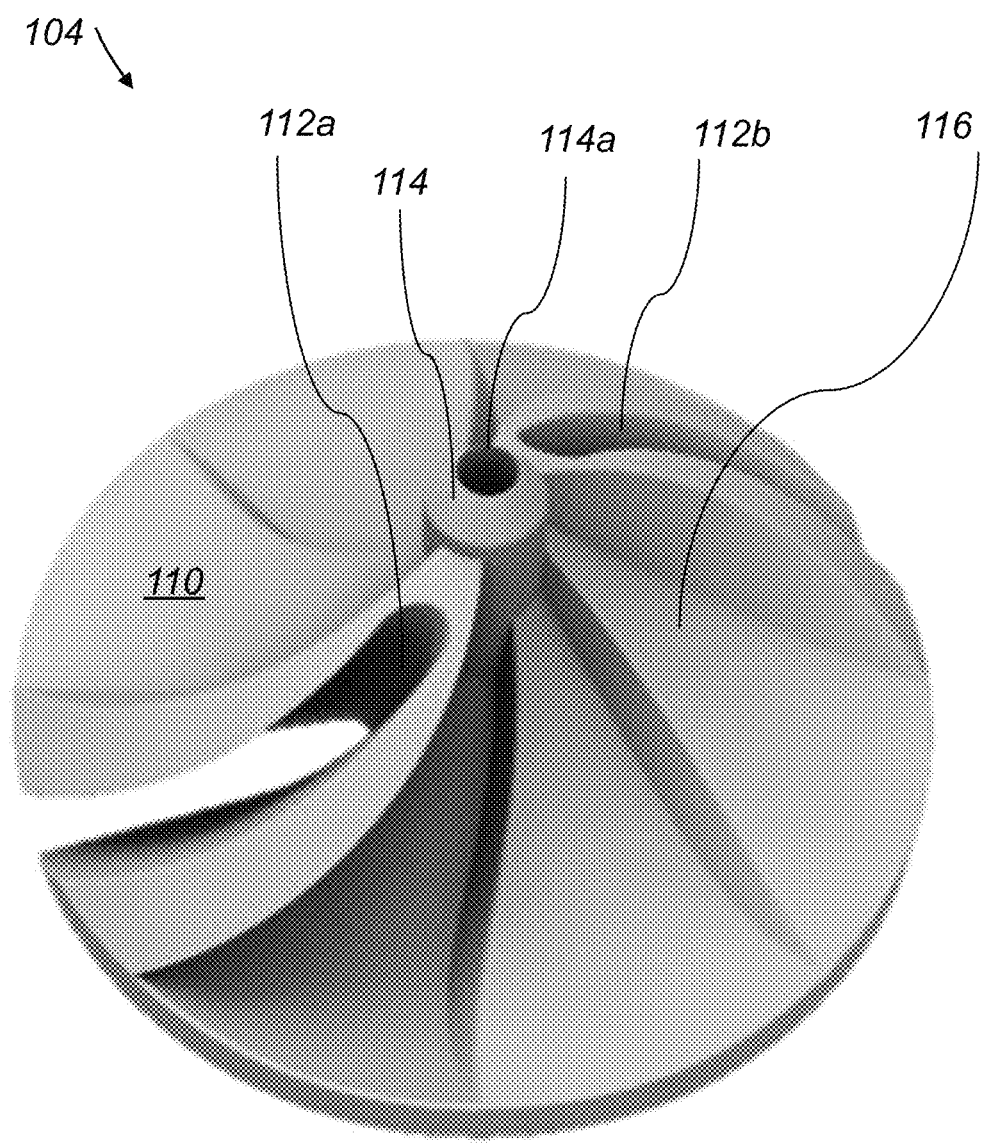
FIG. 3 is a perspective view of the impeller of the wine pump-over device of FIG. 2.
Figure 4:
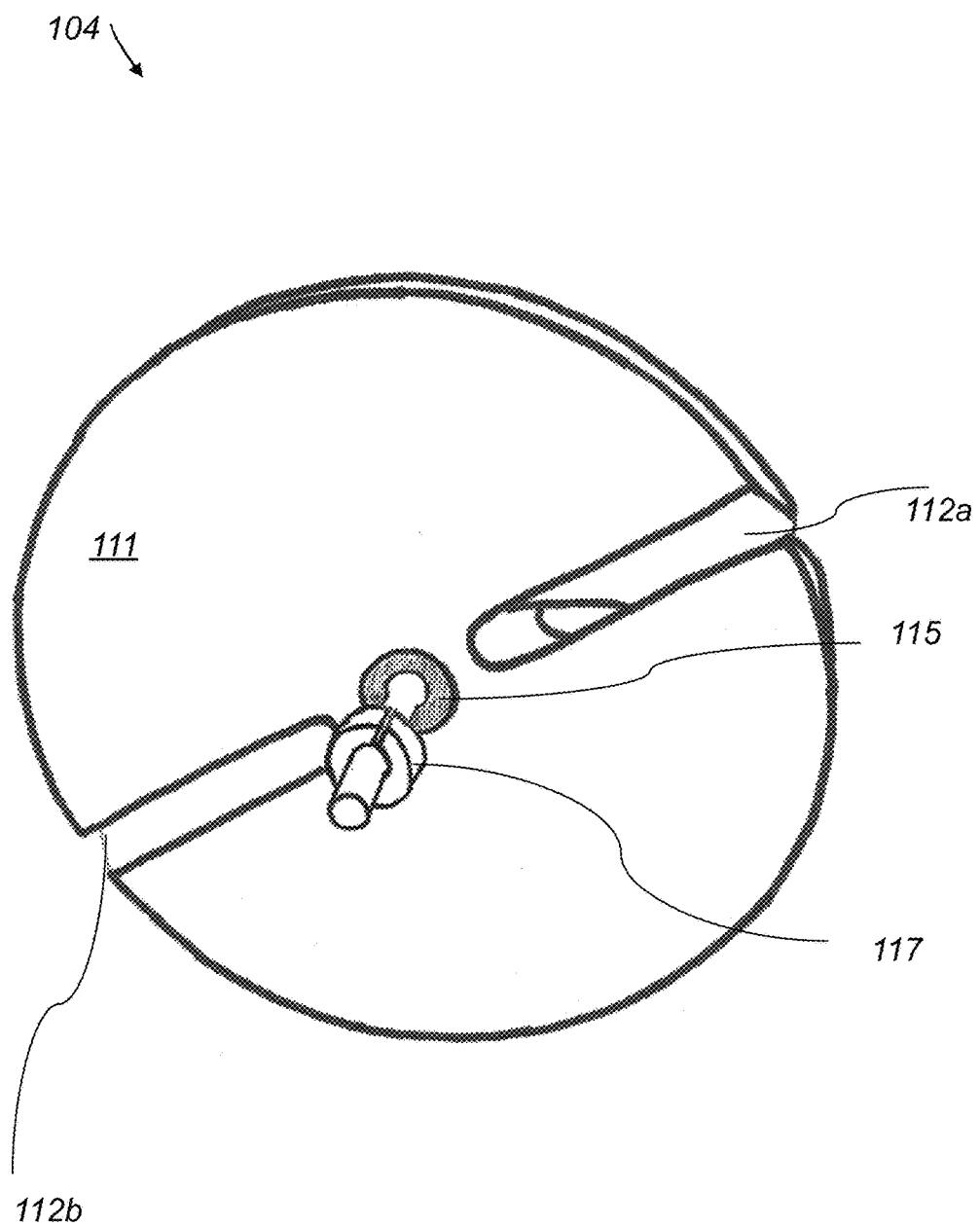
FIG. 4 is a bottom view of the wine pump-over device of FIG. 2.
Figure 5:
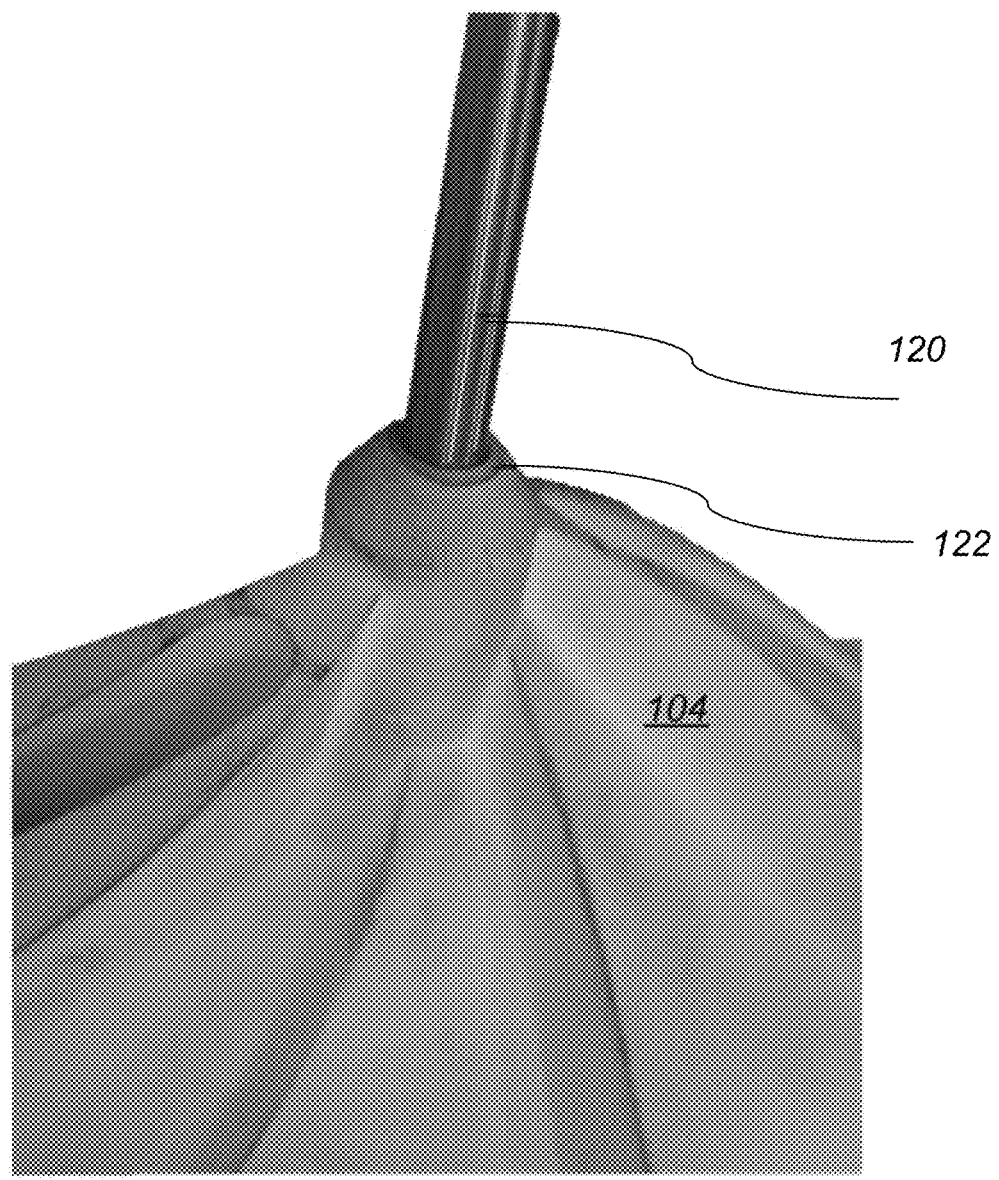
FIG. 5 is a detailed view of the connection between the shaft and the impeller in the wine pump-over device of FIG. 2.
Figure 6:
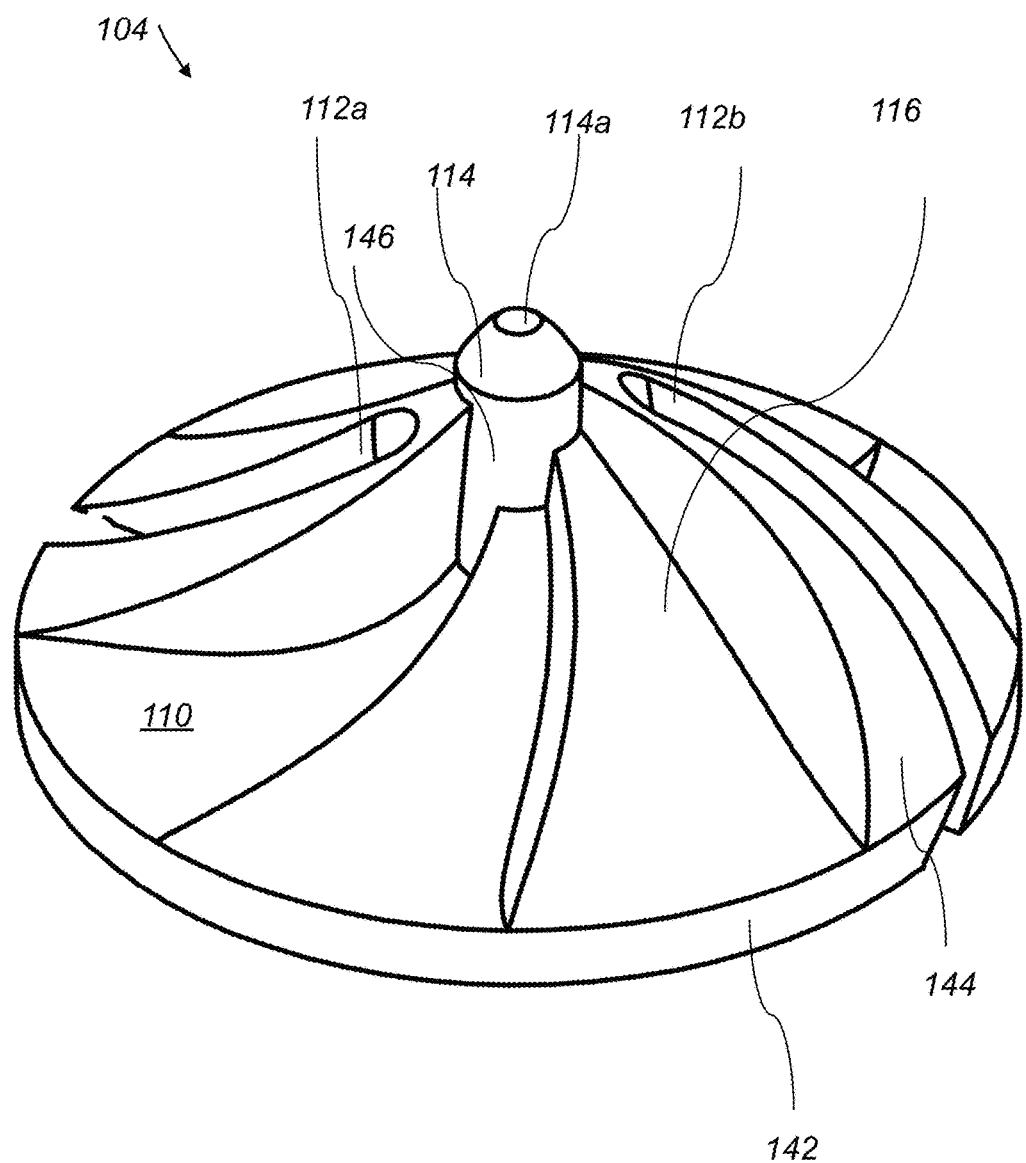
FIG. 6 is a top perspective view of the impeller of the wine pump-over device of FIG. 2.
Figures 7A, 7B:
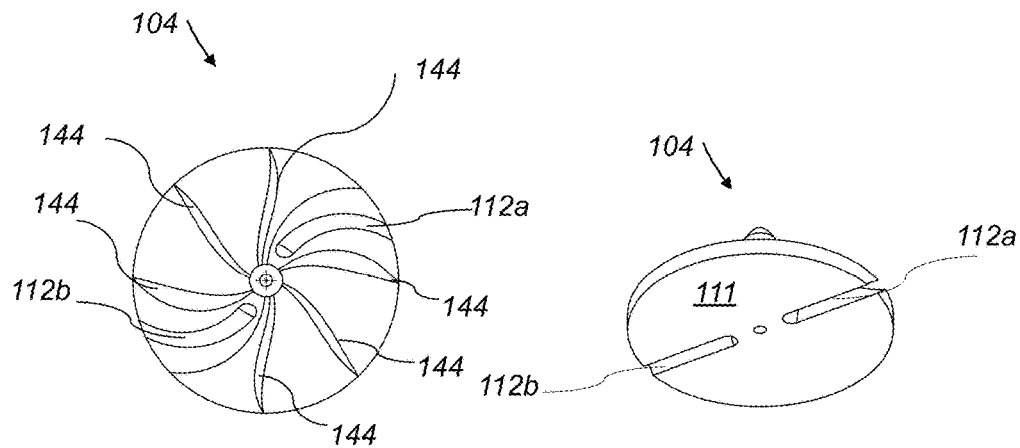
FIG. 7A is a top view of the impeller of FIG. 6.
FIG. 7B is a bottom view of the impeller of FIG. 6.
Figures 7C, 7D:
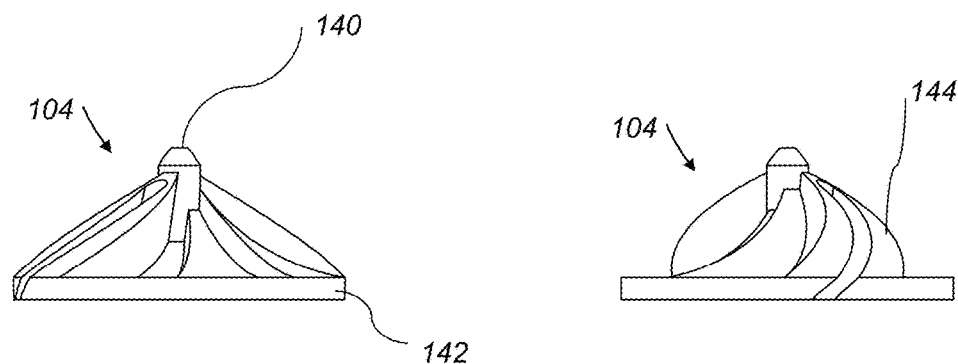
FIG. 7C and FIG. 7D are side views of the impeller of FIG. 6.

Referring to FIG. 1, a fermentation system 80 according to this invention includes a fermentation tank 82, a wine pump-over device 100, a pump 88 and pipes 86 and 87 connecting the pump to the pump-over device 100 and the pump to the tank 82, respectively. The fermentation tank 100 contains the free-run wine 90 in the bottom and the cap 84 in the top surface of the free-run wine. Pump 88 pumps free-run wine 90 from the bottom of the tank 82 to the wine pump-over device 100 and the wine pump-over device 100 distributes the wine over and through the cap uniformly and efficiently.

Referring to FIG. 2-FIG. 5, the wine pump-over device 100 of this invention includes a T-joint member 102, an impeller 104, a shaft 120, a bushing 122, ball bearing 115 and a clamp ring 117. T-joint member 102 has an open side end 124, a bottom opening 126 and a top opening 129. Wine 90 is pumped through the open side end 124 of the T-joint member 102 and is pushed through the bottom opening 126 over the impeller 104. Top opening 129 is covered with a cap 128. Shaft 120 has an end welded to the center 128a of cap 128 and then extends through the T-joint member from the cap 128, passes through the bottom opening 126 and through an opening 114a of the impeller 104. Shaft 120 extends along axis 130 and supports the impeller 104. The impeller 104 is configured to rotate passively around the shaft 120 under the influence of the flowing fluids. A bushing 122 prevents the impeller 104 from swaying and keeps the device 100 rigid. Ball bearing 115 supports the impeller 104 while reducing the rotational friction of the impeller 104 about the shaft 120. Clamp ring 117 secures the position of the impeller 104 relative to the shaft 120 and allows for the adjustment of the distance 132 between the top of the impeller 104 and the bottom of the T-joint member 102. Adjusting distance 132 affects the coverage area of the impeller and the size of the wine droplets. In one example, all of the components of the wine pump-over device 100 including the ball bearing 115 are made of food-grade material such as stainless steel. Bushing 122 is made of plastic, bronze, ceramic, or other metallic materials or alloys. In one example, shaft 120 is a rod having a diameter of 3/8 inch and is made of stainless steel.

Referring to FIG. 3, FIG. 4, FIG. 6 and FIG. 7A-FIG. 7D, impeller 104 has a one-piece continuous conical shaped body 110 that includes a circular base 142 and a cylindrical center 146 that extends from top 140 to base 142. Cylindrical center 146 has a central opening 114a and a conical top 114. Shaft 120 passes through the central opening 114a that extends from the top 140 to the base 142. Impeller body 110 also includes 6 curved blades 144 that extend from the top 140 to the base 142 along the inclined outer surface 116. In other examples impeller 110 includes fewer or more than six blades 144. Curved blades 144 have different slopes and shapes, and are twisted around the cylindrical center 146. The curved blades 144 provide gradual and dynamic slope changes to the outer surface 116 and help prevent "bruising" or "misting" of the wine. Impeller 110 also includes two twisted through-slots 112a, 112b that allow the wine to pass through the slots and wet the cap underneath the impeller 110. Impeller 104 is made of plastic, bronze, ceramic, or other metallic materials or alloys. The one-piece continuous construction of the impeller allows it to be cleaned easily, contributes to unobstructed flow of the wine and prevents clogging of the device.

Figure 8:
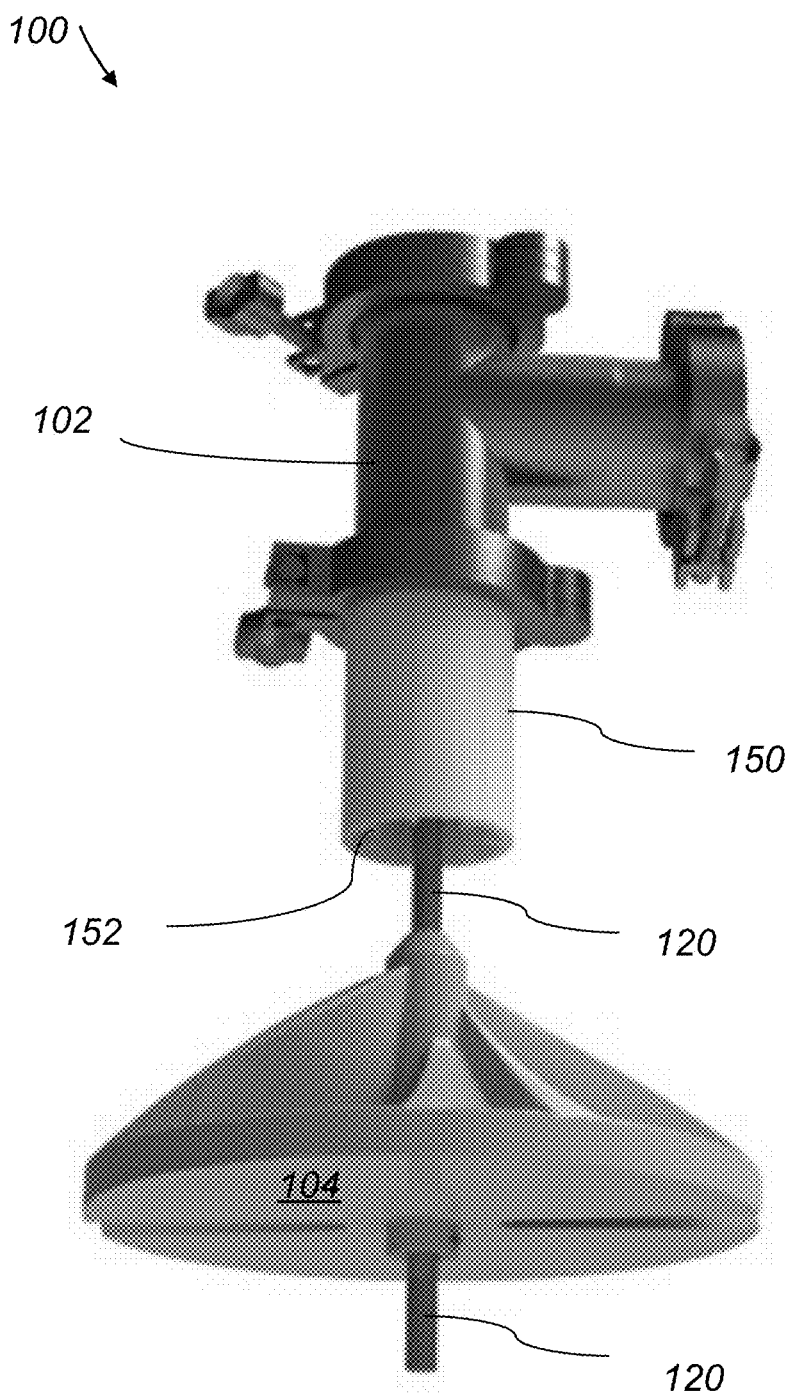
FIG. 8 is a perspective view of the wine pump-over device of FIG. 1 including a flow conditioner.
Figure 9:
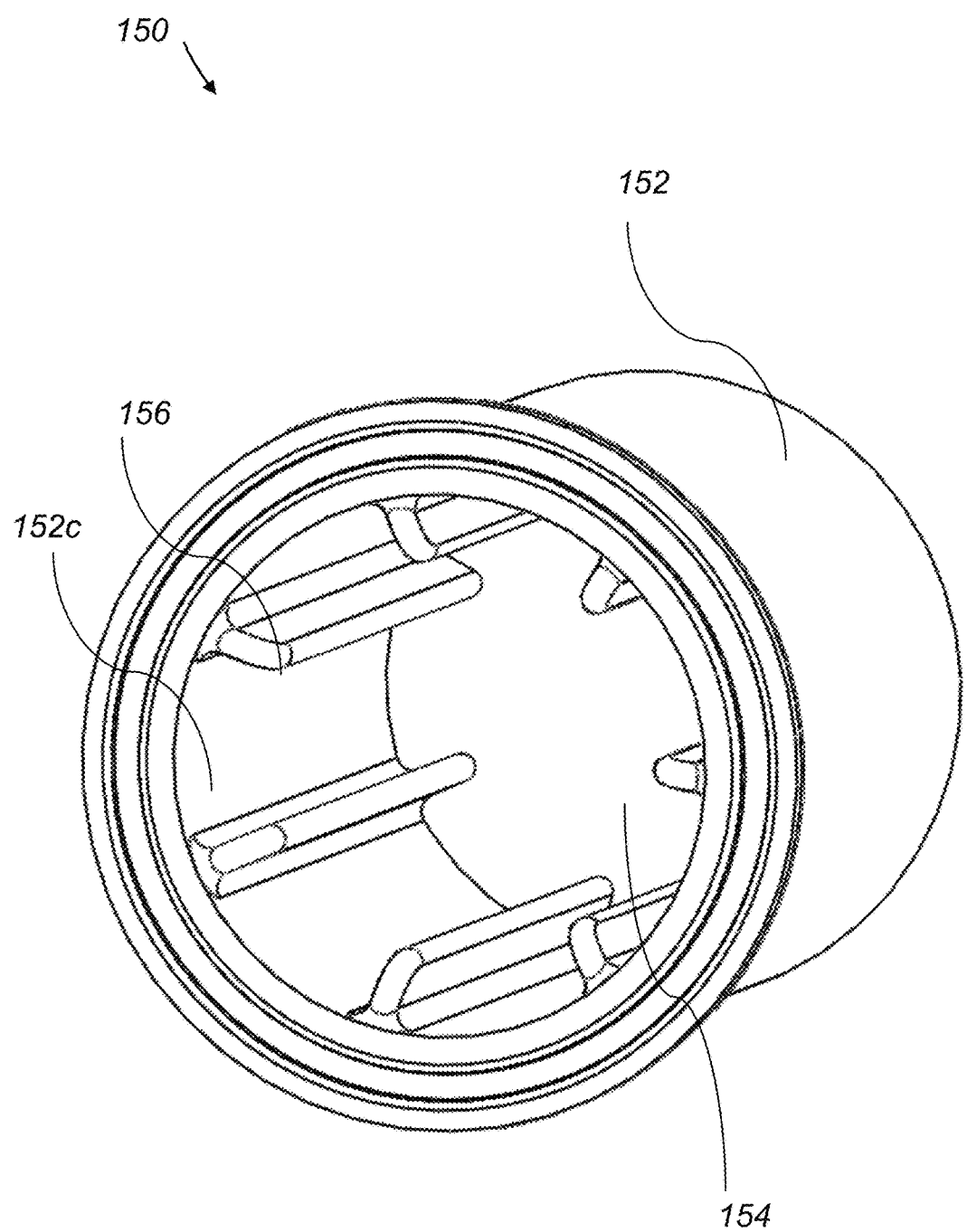
FIG. 9 is a perspective view of the flow conditioner of FIG. 8.
Figure 12:
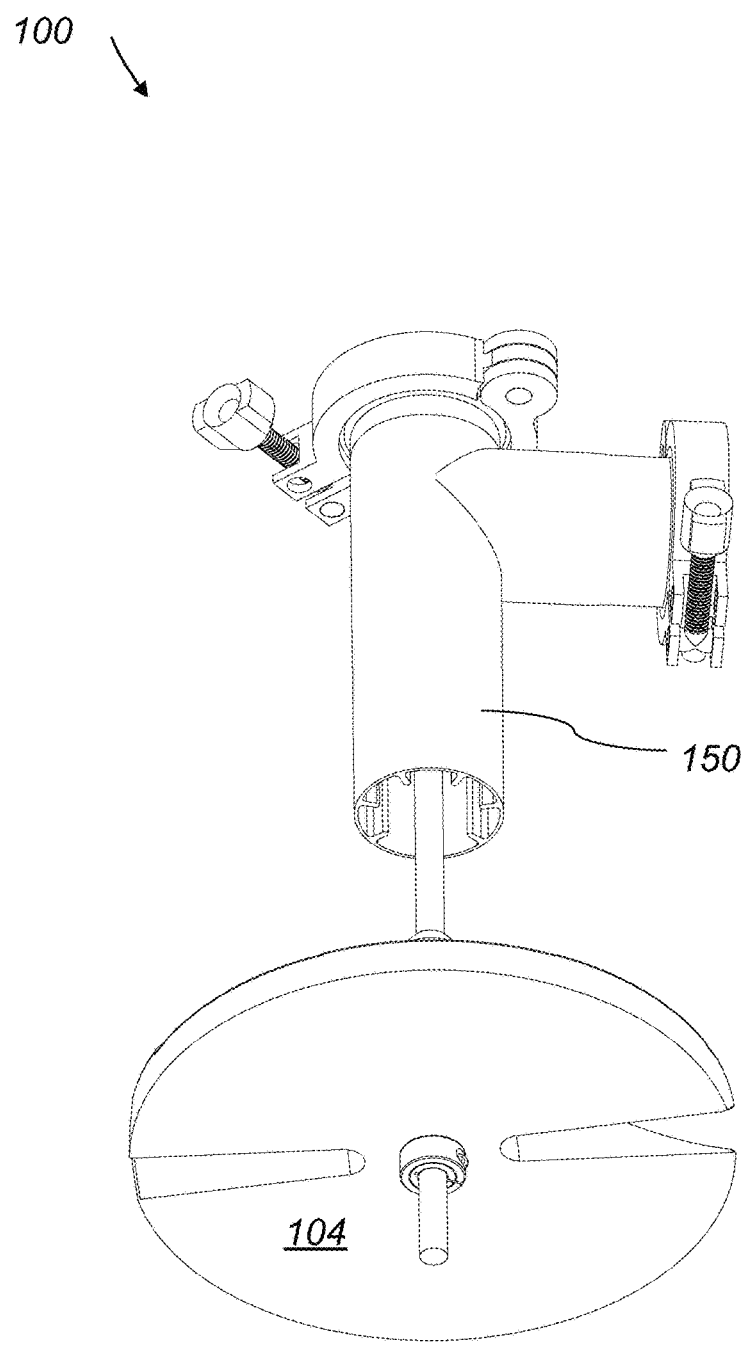
FIG. 12 is a perspective view of the wine pump-over device of FIG. 1 including a flow conditioner integrated with the joint member.

Referring to FIG. 8 and FIG. 9, the wine pump-over device 100 also includes a flow conditioner 150. Flow conditioner 150 includes a cylindrical body 152 having an axial through opening 154 and ridges 156 formed in the inner surface 152c of the cylindrical body. Flow conditioner 150 has an end that connects to the bottom of the T-joint member 102 and surrounds the shaft 120. Flow conditioner 150 aids in making the flow of the wine more uniform as it exits from the T-joint. In other embodiments, flow conditioner 150 extends from the bottom of the T-joint member 102 and is integral with the T-joint member 102, as shown in FIG. 12.

Figure 10:
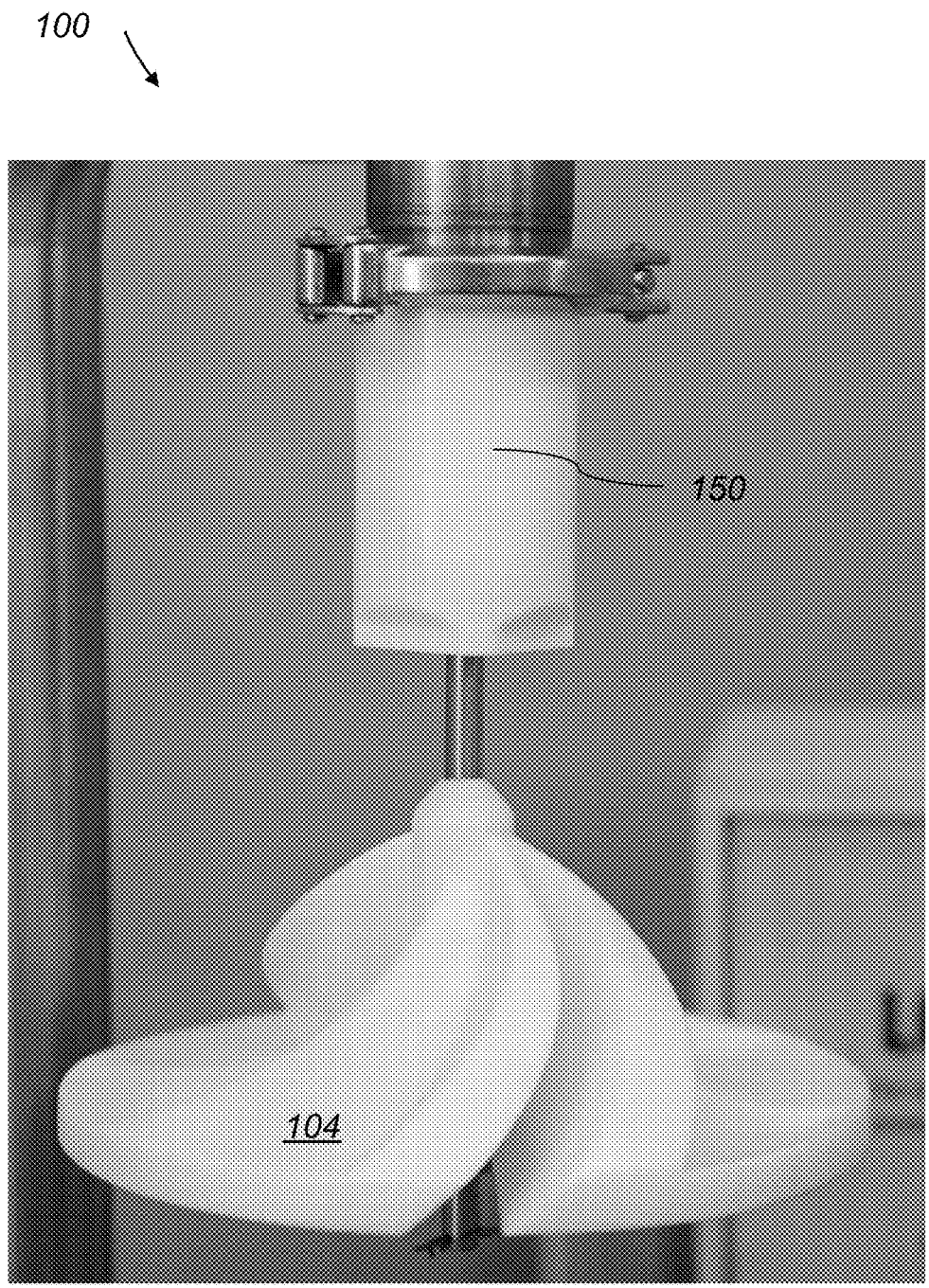
FIG. 10 is a perspective view of the wine pump-over device of FIG. 1 including another embodiment of a flow conditioner, according to this invention.
Figure 10A:
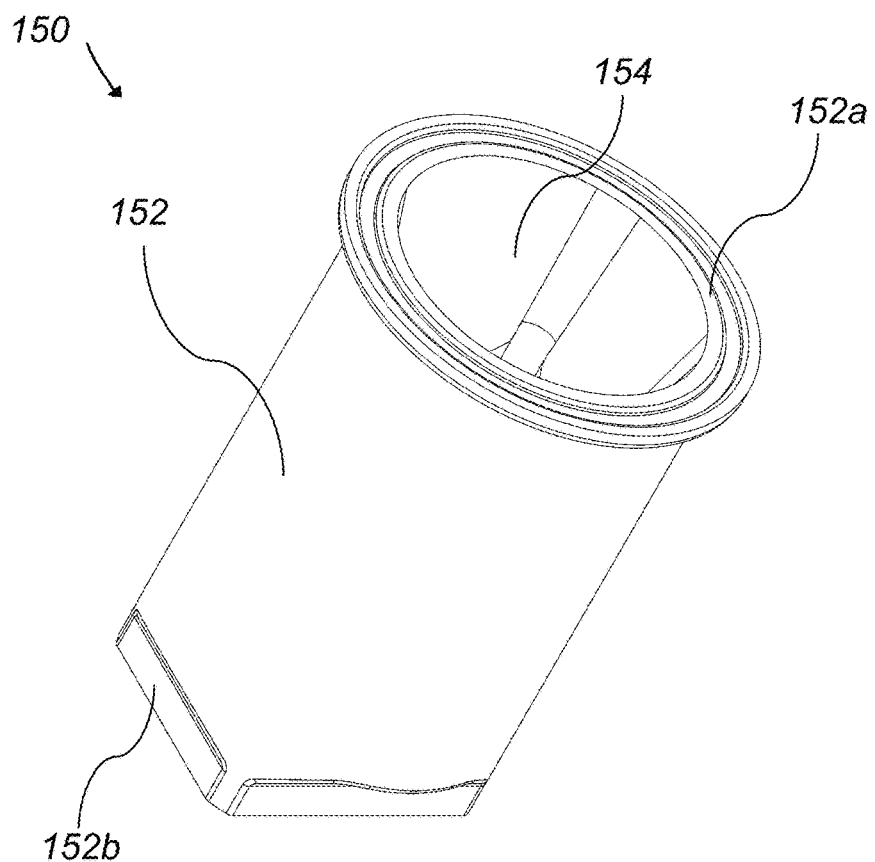
FIG. 10A is a perspective view of the embodiment of the flow conditioner of FIG. 10.
Figure 10B:
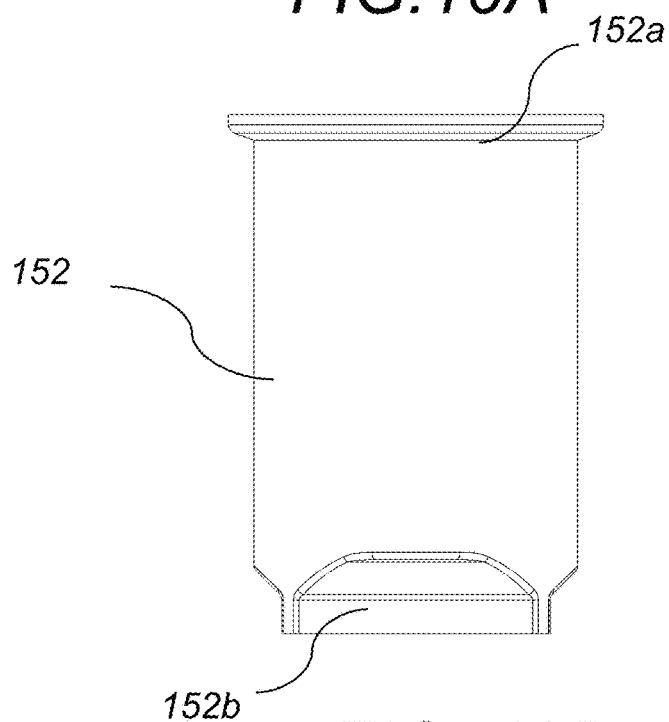
FIG. 10B is a side view of the flow conditioner of FIG. 10A.
Figure 10C:
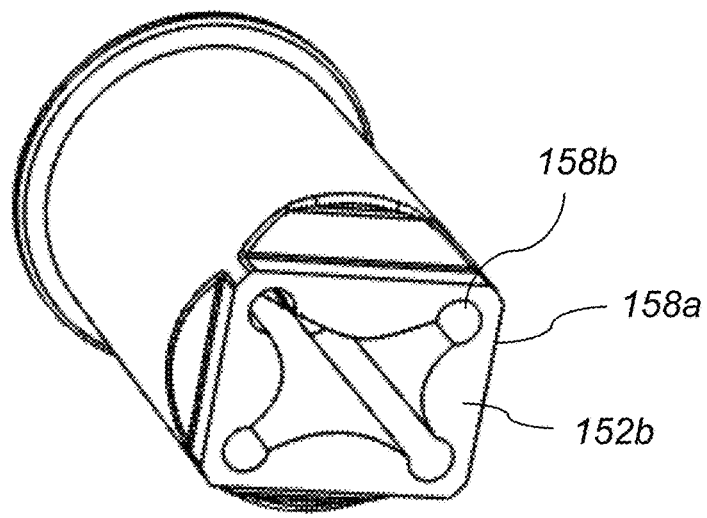
FIG. 10C is a bottom perspective view of the flow conditioner of FIG. 10A.
Figure 10D:
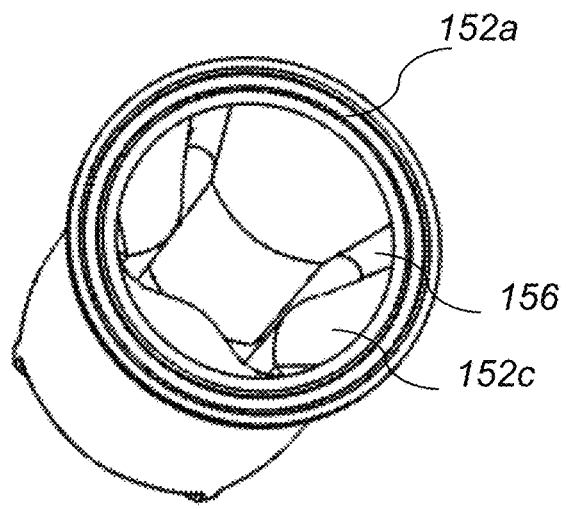
FIG. 10D is a top perspective view of the flow conditioner of FIG. 10A.
Figure 10E:
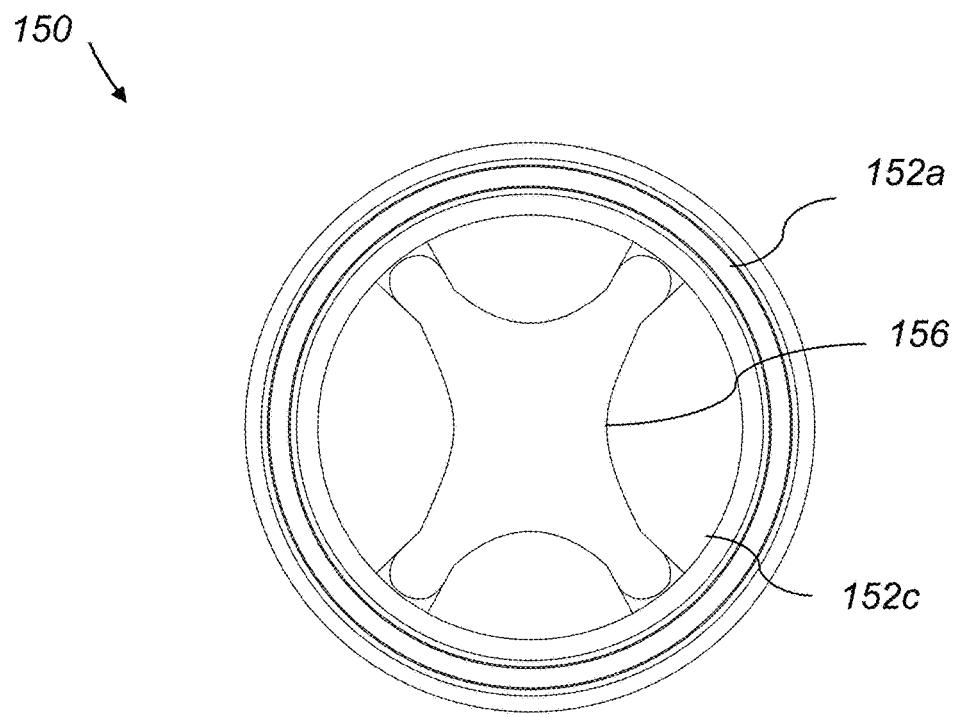
FIG. 10E is a top view of the flow conditioner of FIG. 10A.
Figure 10F:
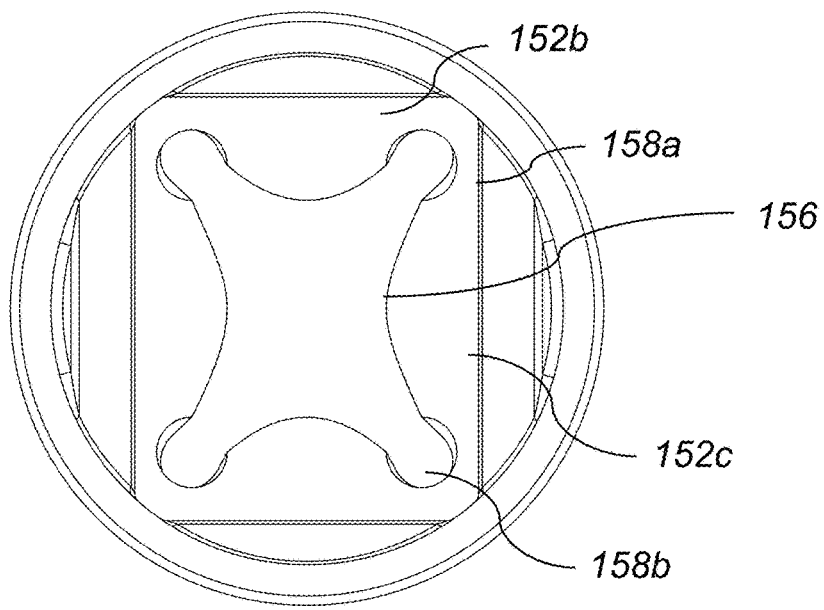
FIG. 10F is a bottom view of the flow conditioner of FIG. 10A.
Figure 11A:
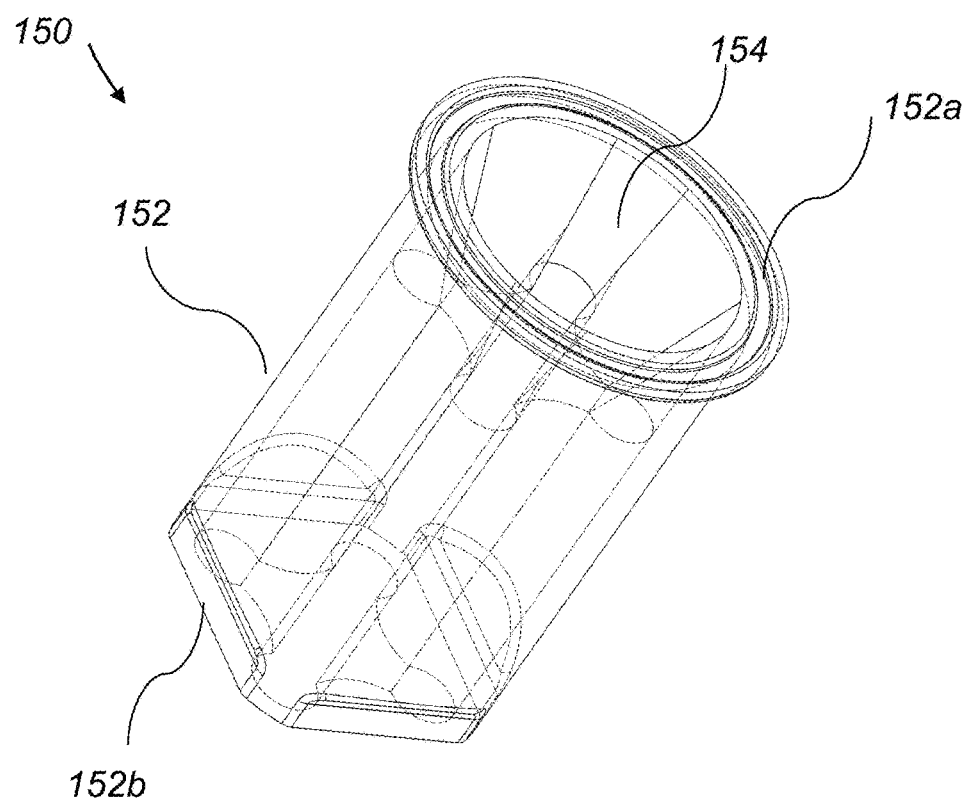
FIG. 11A is a transparent perspective view of another embodiment of the flow conditioner, according to this invention.
Figure 11B:
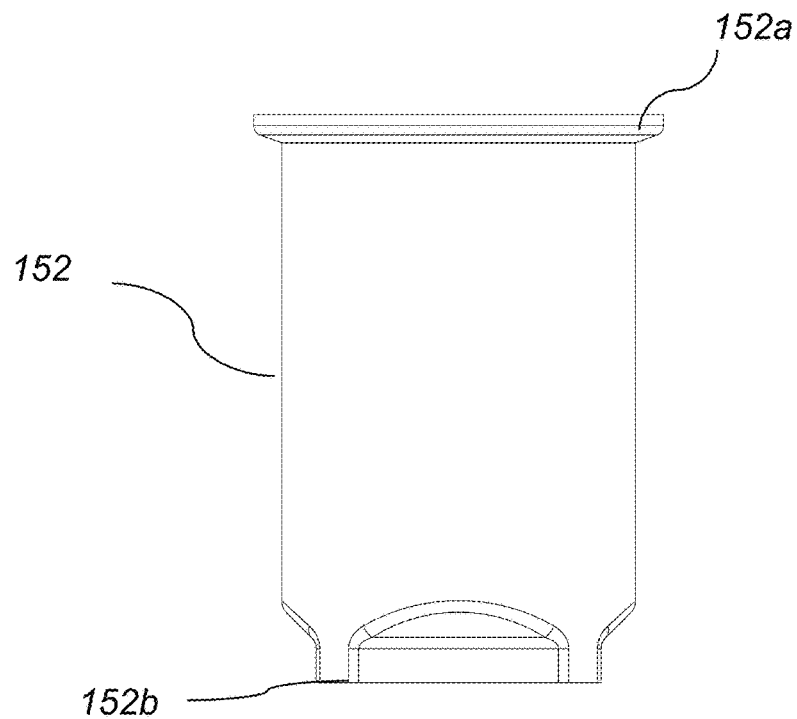
FIG. 11B is a side view of the flow conditioner of FIG. 11A.
Figure 11C:
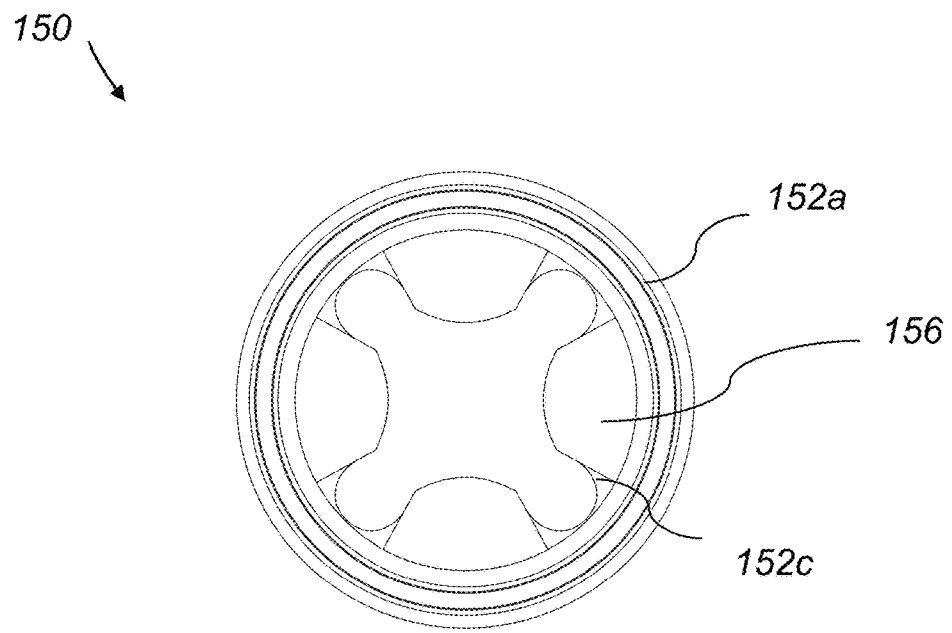
FIG. 11C is a top view of the flow conditioner of FIG. 11A.
Figure 11D:
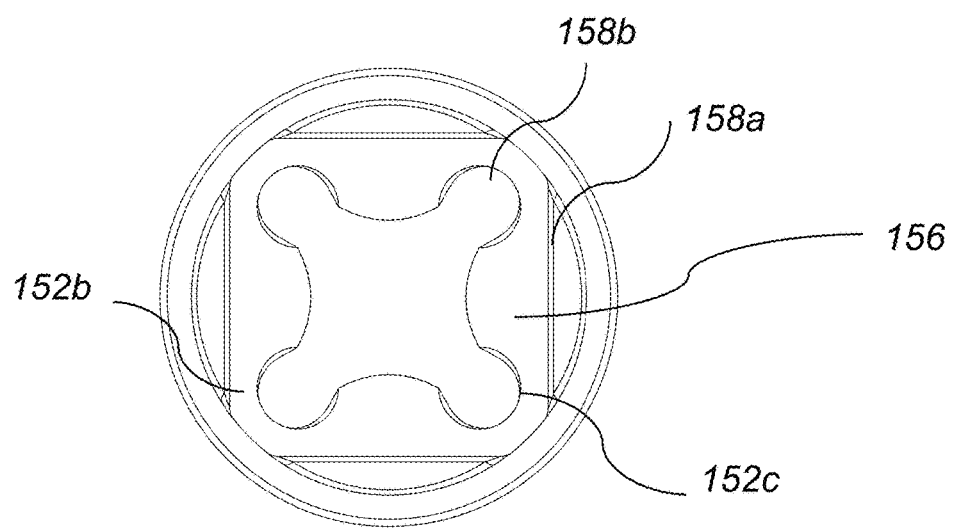
FIG. 11D is a bottom view of the flow conditioner of FIG. 11A.

In other embodiments, the bottom opening of the flow conditioner is shaped to match the shape of the fermentation tank, as shown in FIG. 10. Referring to FIG. 10A-FIG. 10F, in another embodiment, flow conditioner 150 includes a cylindrical body 152 having a circular top 152a and a bottom 152b with a rectangular outer perimeter 158a and cloverleaf shaped inner perimeter 158b. An axial through opening 154 extends from the top to the bottom and includes inward curved ridges 156 formed in the inner surface 152c of the cylindrical body 152. This embodiment of the flow conditioner is preferably used in connection with a rectangular fermentation tank The rounded corners of the cloverleaf shaped inner perimeter 158b and the curved ridges 156 help distribute the fermented liquid smoothly over the rectangular-shaped tanks without overshooting on the edges or missing the corners of the fermentation tank. Winemakers do not need to rely on manually wetting the corners of their tanks Furthermore, excessive splashing of the fermented liquid onto or over the sides is reduced.

Referring to FIG. 11A-FIG. 11D, in another embodiment, flow conditioner 150 includes a cylindrical body 152 having a circular top 152a and a bottom 152b with a square outer perimeter 158a and cloverleaf shaped inner perimeter 158b. An axial through opening 154 extends from the top to the bottom and includes inward curved ridges 156 formed in the inner surface 152c of the cylindrical body 152. This embodiment of the flow conditioner is preferably used in connection with a square fermentation tank. The rounded corners of the cloverleaf shaped inner perimeter 158b and the curved ridges 156 help distribute the fermented liquid smoothly over the square-shaped tanks without overshooting on the edges or missing the corners of the fermentation tank. Winemakers do not need to rely on manually wetting the corners of their tanks Furthermore, excessive splashing of the fermented liquid onto or over the sides is reduced.

The fermentation system 80 may be used for any type of fermented liquid including wine, cider, tea, coffee, probiotic liquids, among others.

Several embodiments of the present invention have been described. Nevertheless, it will be understood that various modifications may be made without departing from the spirit and scope of the invention. Accordingly, other embodiments are within the scope of the following claims.

What is claimed is:

1. A device for distributing a fermented liquid uniformly over a fermented cap in a fermentation tank comprising:
   a joint member comprising a top opening, a bottom opening, a side opening, a through-opening extending from said top opening to said bottom opening and a side-through-opening extending from said side opening to said through-opening;
   an impeller comprising a one-piece conical shaped body, wherein said one-piece conical shaped body comprises a central-through-opening;
   a shaft extending through said through-opening of the joint member and through said central-through-opening of the impeller;
   a flow conditioner extending from the bottom of the joint member and surrounding the shaft and being configured to optimize together with the impeller the flow of the fermented liquid in the fermentation tank over the fermented cap;
   wherein the joint member is configured to allow the fermented liquid to be pumped into the through-opening through the side opening and to exit through the bottom opening and to flow onto the impeller and wherein the impeller is configured to allow the fermented liquid to flow uniformly around and down the conical-shaped body of the impeller and through the impeller;
   wherein the bottom of the flow conditioner is shaped to match the shape of the fermentation tank.

2. The device of claim 1, wherein the flow conditioner comprises an elongated body having an axial through-opening.

3. The device of claim 2, wherein the flow conditioner further comprises ridges formed in an inner surface of the elongated body.

4. The device of claim 2, wherein the elongated body of the flow conditioner comprises a bottom with a rectangular inner perimeter.

5. The device of claim 2, wherein the elongated body of the flow conditioner comprises a bottom with a square inner perimeter.

6. The device of claim 2, wherein the bottom of the flow conditioner comprises a cloverleaf shaped inner perimeter.

7. The device of claim 1, wherein the flow conditioner is integral with the joint member.

8. The device of claim 1, wherein said one-piece conical shaped body comprises a circular base, a cylindrical center, a conical-shaped outer surface, said central-through-opening extending through said cylindrical center, and one or more curved blades extending from a top of the cylindrical center along the inclined outer surface.

9. The device of claim 8, wherein each of the curved blades is configured to be twisted around the cylindrical center and comprises a slope different from another curved blade's slope.

10. The device of claim 8, wherein each of the curved blades further comprises a shape different from another curved blade's shape.

11. The device of claim 1, wherein the impeller further comprises one or more twisted through-slots that allow the fermented liquid to pass through the impeller and wet the fermented cap underneath the impeller.

12. The device of claim 8, wherein the top of the cylindrical center comprises a conical shape.

13. The device of claim 8, wherein the one-piece conical shaped body of the impeller comprises one of plastic, bronze, stainless steel, ceramic, metals, alloys or composites.

14. The device of claim 1, further comprising a cover configured to cover the top opening of the joint member and wherein a top end of the shaft is attached to a center of the cover.

15. The device of claim 1, wherein the impeller is configured to rotate around the shaft.

16. The device of claim 15, further comprising a bearing configured to reduce rotational friction during the rotation of the impeller.

17. The device of claim 16, wherein the bearing comprises one of plastic, bronze, stainless steel, ceramic, metals, alloys or composites.

18. The device of claim 8, further comprising a bushing configured to be inserted into the central-through-opening and to prevent swaying of the impeller.

19. The device of claim 18, wherein the bushing comprises one of plastic, bronze, stainless steel, ceramic, metals, alloys or composites.

20. The device of claim 1, wherein a distance between the top of the impeller and the bottom of the joint member is configured to be adjustable.

21. The device of claim 20, further comprising a clamp ring configured to secure the position of the impeller relative to the shaft and thereby to adjust the distance between the top of the impeller and the bottom of the joint member.

* * * * *